United States Patent
Vasa et al.

(10) Patent No.: US 11,354,653 B2
(45) Date of Patent: Jun. 7, 2022

(54) SYSTEMS AND METHODS FOR USING DISTRIBUTED LEDGER MICRO REPORTING TOOLS

(71) Applicant: JPMORGAN CHASE BANK, N.A., New York, NY (US)

(72) Inventors: Karan Anil Vasa, London (GB); Rohan Sunil Kaluskar, Mumbai (IN); Uday R. Sawant, Thane (IN); Gaurav Massand, Ulhasnagar (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 357 days.

(21) Appl. No.: 16/701,240

(22) Filed: Dec. 3, 2019

(65) Prior Publication Data

US 2021/0166219 A1   Jun. 3, 2021

(51) Int. Cl.
*G06Q 20/36* (2012.01)
*G06Q 20/38* (2012.01)
*H04L 9/06* (2006.01)

(52) U.S. Cl.
CPC ..... *G06Q 20/3678* (2013.01); *G06Q 20/3827* (2013.01); *H04L 9/0637* (2013.01); *H04L 9/0643* (2013.01)

(58) Field of Classification Search
CPC .......... G06Q 20/3678; G06Q 20/3827; G06Q 20/065; G06Q 20/3823; H04L 9/0637; H04L 9/0643; H04L 9/3239; H04L 2463/121; H04L 63/0428; H04L 63/123; H04L 2209/38; H04L 2209/42
USPC ......................................................... 705/69
See application file for complete search history.

(56) References Cited

U.S. PATENT DOCUMENTS

| | | | | |
|---|---|---|---|---|
| 11,089,478 | B2* | 8/2021 | Moshir | H04W 12/106 |
| 2019/0281465 | A1* | 9/2019 | Moshir | H04M 3/2218 |
| 2020/0374106 | A1* | 11/2020 | Padmanabhan | H04L 63/0428 |

FOREIGN PATENT DOCUMENTS

| | | | |
|---|---|---|---|
| CN | 109634959 A | * | 4/2019 |
| KR | 20200127643 A | * | 11/2020 |

OTHER PUBLICATIONS

Xu et al. ("vChain: Enabling Verifiable Boolean Range Queries over Blockchain Databases", SIGMOD '19, Jun. 30-Jul. 5, 2019, Amsterdam, Netherlands, ©2019 Association for Computing Machinery, pp. 141-158) (Year: 2019).*

(Continued)

*Primary Examiner* — James D Nigh
(74) *Attorney, Agent, or Firm* — Greenberg Traurig LLP

(57) ABSTRACT

Systems and methods for using distributed ledger micro reporting tools are disclosed. In one embodiment, in a distributed computer application executed by an information processing apparatus comprising at least one computer processor, a method for using a distributed ledger micro reporting tool may include: (1) an event listener establishing a connection a distributed ledger; (2) in response to the creation of each block of a plurality of blocks on the distributed ledger, the listener reading block details from the block, wherein the block comprises a plurality of transactions, and the block details comprise a transaction hash for each of the plurality of transactions; (3) indexing the transaction hash with a timestamp; and (4) storing the index of the transaction hash with the timestamp.

18 Claims, 2 Drawing Sheets

(56) References Cited

OTHER PUBLICATIONS

Riegger et al. ("Efficient Data and Indexing Structure for Blockchains in Enterprise Systems", iiWAS '18, Nov. 19-21, 2018, Yogyakarta, Indonesia, ©2018 Association for Computing Machinery, 10 pages) (Year: 2018).*
Huang ("A Blockchain-Based Framework for Secure Log Storage", 2019 IEEE 2nd International Conference on Computer and Communication Engineering Technology-CCET, Aug. 9, 2019, pp. 96-100) (Year: 2019).*
Machine translation of Chinese Patent Publication CN-108319629 B, published Dec. 10, 2019, 27 pages (Year: 2019).*

* cited by examiner

SYSTEMS AND METHODS FOR USING DISTRIBUTED LEDGER MICRO REPORTING TOOLS

BACKGROUND OF THE INVENTION

1. Field of the Invention

Embodiments are directed to systems and methods for using distributed ledger micro reporting tools.

2. Description of the Related Art

Companies/Industries have started realizing benefits of Blockchain networks that are based on decentralization (i.e., no central authority governing body), transparency (i.e., information is readily available for all the participants to have a look, provided it is public) and immutability (i.e., transactions are recorded across many participant nodes on the Blockchain so that any involved record cannot be altered retroactively, without the alteration of all subsequent blocks). Blockchains can be viewed as public (e.g., blockchain that are primarily found in the cryptocurrency universe that offer anonymous identity of the clients) or private/permissioned (e.g., blockchains that are implemented behind a company's firewall and have known identities exchanging information amongst each other). This peer to peer network concept (private/permissioned blockchains) has provided an additional challenge in various industries which are currently planning an extensive roll out of private Blockchain networks like the payments industry, the healthcare industry, message transfer, etc. as to how the participant of the network is able to capture information on the fly.

SUMMARY OF THE INVENTION

Systems and methods for using distributed ledger micro reporting tools are disclosed. In one embodiment, in a distributed computer application executed by an information processing apparatus comprising at least one computer processor, a method for using a distributed ledger micro reporting tool may include: (1) an event listener establishing a connection to a distributed ledger; (2) in response to the creation of each block of a plurality of blocks on the distributed ledger, the listener reading block details from the block, wherein the block comprises a plurality of transactions, and the block details comprise a transaction hash for each of the plurality of transactions; (3) indexing the transaction hash with a timestamp; and (4) storing the index of the transaction hash with the timestamp.

In one embodiment, at least one of the plurality of transactions in the block is encrypted.

In one embodiment, at least one of the plurality of transactions is a private transaction.

In one embodiment, at least some of the transactions involve parties other than a party associated with the distributed application.

In one embodiment, the method may further include receiving, from a user interface as part of a user session, a search request, wherein the search request identifies at least one transaction date; identifying, using the index, one of the plurality of blocks that comprises at least one transaction meeting the transaction date; retrieving in the identified block from the distributed ledger; extracting the transactions from the retrieved block; and invaliding the transactions at an end of the user session.

In one embodiment, the user interface may be a lightweight graphical user interface.

In one embodiment, user interface may be executed by an electronic device.

In one embodiment, the transactions in the block may be encrypted, and the method may further include decrypting the encrypted transactions.

In one embodiment, the method may further include filtering unwanted transactions from the extracted transactions.

According to another embodiment, a system for using a distributed ledger micro reporting tool may include a distributed ledger network comprising a plurality of nodes, each node comprising a copy of a distributed ledger, and a distributed application executed by each node comprising an event listener in communication with the copy of the distributed ledger. The event listener may establish a connection the copy of the distributed ledger. In response to the creation of each block of a plurality of blocks on the distributed ledger, the event listener may read block details from the block, wherein the block comprises a plurality of transactions, and the block details comprise a transaction hash for each of the plurality of transactions, may index the transaction hash with a timestamp, and may store the index of the transaction hash with the timestamp in a hash index.

In one embodiment, at least one of the plurality of transactions in the block is encrypted.

In one embodiment, at least one of the plurality of transactions is a private transaction.

In one embodiment, at least some of the transactions involve parties other than a party associated with the distributed application.

In one embodiment, the system may include a user device comprising at least one computer processor, and a user interface in the distributed computer application receives a search request from the user device, wherein the search request identifies at least one transaction date, the distributed computer application identifies, using the hash index, one of the plurality of blocks that comprises at least one transaction meeting the transaction date, the distributed computer application retrieves the identified block from the distributed ledger, the distributed computer application extracts the transactions from the retrieved block, and the distributed computer application invalidates the transactions on the user interface at an end of the user session.

In one embodiment, the user interface may be a lightweight graphical user interface.

In one embodiment, the user interface may be executed by an electronic device.

In one embodiment, the transactions in the block may be encrypted, and the distributed computer application decrypts the encrypted transactions.

In one embodiment, the distributed computer application may decrypt filters filtering unwanted from the transactions.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for using distributed ledger micro reporting tools. In one embodiment, a distributed ledger micro reporting tool provide a lightweight solution that addresses the reporting problems available on Blockchain network, such as Private/Permissioned blockchains. The distributed ledger micro reporting tool is developed as a distributed app, or "DApp," that can be easily deployed to any blockchain node. Because it is small and lightweight, in embodiments, the distributed ledger micro reporting tool may be part of the blockchain node itself.

In embodiments, the distributed ledger micro reporting tool may include the following components: (1) an interface/listener to blockchain network (e.g., web3 in an Ethereum blockchain), (2) middleware that receives block related data from interface/listener and is responsible for indexing the required data for the faster access and may provide secured APIs for the frontend graphical user interface ("GUI") to showcase data/information; and (3) a frontend GUI to visualize the data, generate, schedule and distribute reports. These interconnected components may form a single DApp that may be, for example, less than 50 Mb (containerized) depending on choice the implementations environments.

In one embodiment, light-weight user interfaces to showcase the data may be used. Examples include SIGMA and Perspective Workspaces. Any other suitable user interface may be used as is necessary and/or desired.

In one embodiment, the distributed ledger micro-reporting tool may be distributed as an application to clients.

In one embodiment, a Javascript library may be used as a scheduler to share downloaded data with others as specified by the client.

Figure 1:
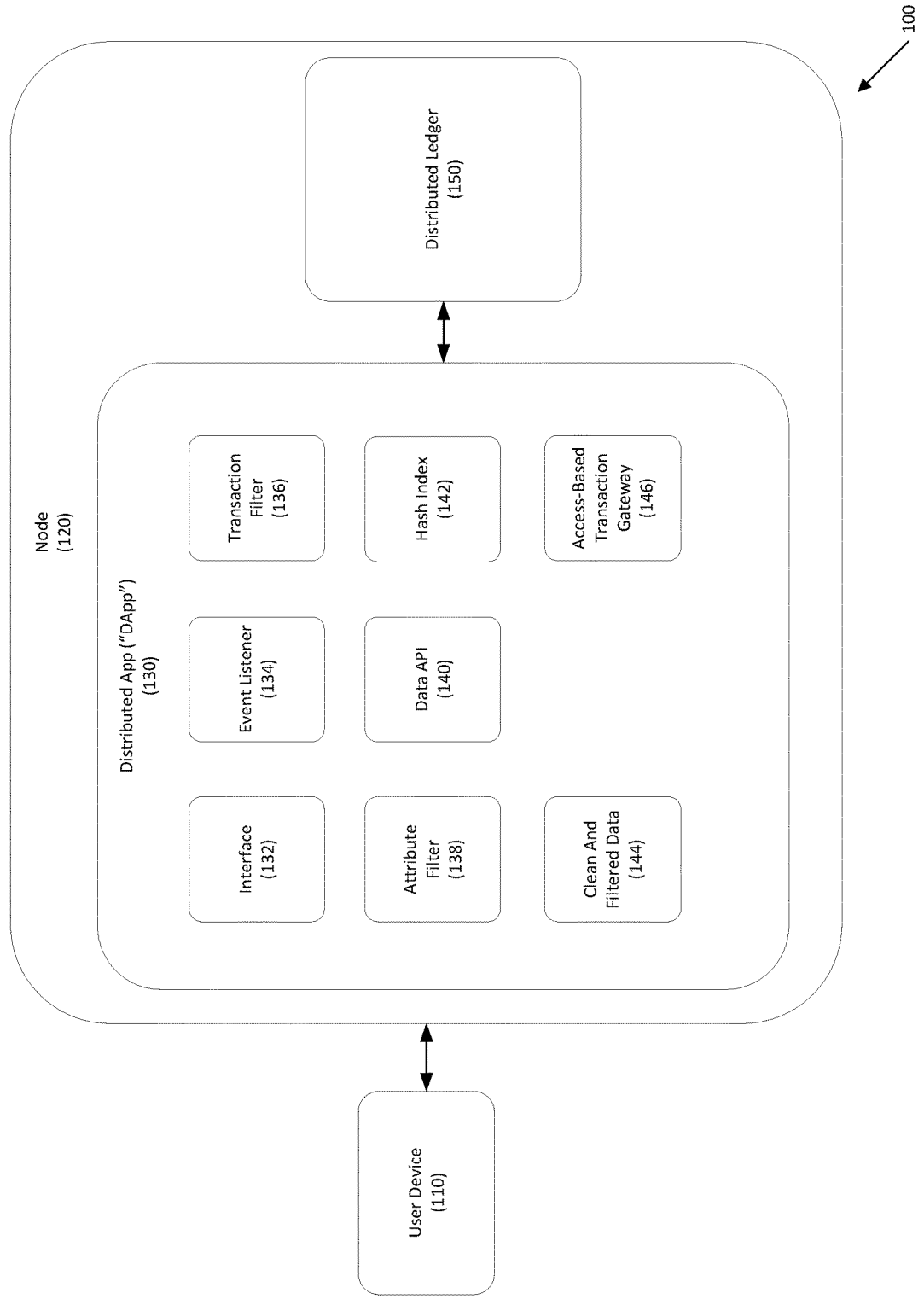
FIG. 1 depicts a system for using distributed ledger micro reporting tools according to one embodiment.

Referring to FIG. 1, a distributed ledger micro reporting tool is disclosed according to one embodiment. System 100 may include user device 110 and node 120. Node 120 may include distributed app ("DApp") 130, and copy of distributed ledger 150. Node 120 may be one of a plurality of nodes in a distributed ledger network (not shown), and each node may maintain a copy of the distributed ledger.

User device 110 may be any suitable electronic device, including, for example, desktop computers, notebook computers, workstations, tablet computers, smartphones, Internet of Things ("IoT") appliances, servers, and other systems. User device 110 may present a user interface, which may be a light-weight user interface such as SIGMA or Perspective Workspaces. Other suitable user interfaces may be used as is necessary and/or desired.

DApp 130 may be a suitable distributed computing application that may be executed on node 120. In one embodiment, DApp 130 may include interface 132, event listener 134, transaction filer 136, attribute filter 138, data API 140, hash index 142, clean and filtered data 144, and access-based transaction gateway 146.

In one embodiment, node 120 may include distributed ledger 150, which may be a copy of a distributed ledger maintained in the distributed ledger network (not shown).

In one embodiment, interface 132 may connect DApp 130 with distributed ledger 150. For example, interface 132 may comprise a Javascript library. An example of a suitable interface 132 is a Web3-Quorum interface that may support any suitable infrastructure (e.g., the Interbank Information Network (IIN)), such as Quorum.js Event listener 134 may be an event handler for DApp 130 that may be notified when a new block is generated in the distributed ledger network. Event listener 134 may poll the block that is generated for further processing.

Hash index 142 may store a transaction hash of each transaction in the block and the time stamp of the block. For example, the transaction hash may be a unique identifier of each transaction that facilitates searching across the blocks present in the distributed ledger network. Hash index 142 may enable faster retrieval and security controls.

Other types of identifiers, such as the block hash, block id, block payload details, transaction id, transaction payload details, etc. may also be used to locate a particular transaction in the distributed ledger.

In one embodiment, a distributed ledger network may include thousands to millions of blocks, and each block containing information that may assist the clients that are part of the network. The distributed ledger is decentralized due to which there is not an easy way to fetch the information from the blocks that have been requested by the client. As there is a linear growth relationship between number of blocks added versus retrieval time, embodiments use the transaction hash and its timestamp stored in an in-memory index component to fetch the transaction/information details from the blocks present in the blockchain for selected time range.

In one embodiment, the in-memory index may be updated with every new block added to the network and is available for every client/node to access it via the distributed ledger. By using a date/time filter, the in-memory index fetches all blocks within the specified time range to quickly return transaction details contained in those blocks.

In embodiments, advanced security controls may be provided. For example, the transaction hash details/time stamp are stored in index which lies inside one or more of the nodes in the distributed ledger network. When the user queries for a particular set of records, the index is initiated and the data is retrieved directly from the blocks using Data API 140. Thus, the data in the block is retrieved without the data being cached or stored on the local drive.

Transaction filter 136 may receive data from event listener, including the date and time of the block generation when it was passed between clients of the distributed ledger network.

Attribute Filter 138 may select certain attributes for node 130. For example, in the case of IIN, apart from Payment transactional information, the IIN may carry news, messages, and other data. Attribute filter 138 may apply selection criteria to the data and to select the various attributes present in the transaction information. Once it has been selected, the reports are generated using the same set of attributes.

Clean and filtered data 144 may be the result of the application of transaction filter 136 and attribute filter 138. In one embodiment, the Filtered data that the node may receive may be checked using access-based transaction gateway 146 for encrypted secured storage by virtue of private/public keys available with the node, to avoid any authorization mismatch.

Data API 140 may provide an interface for the index to be exposed to the filters used by the UI component, such as Sigma. It enables the user's input of date filter inserted in the UI to be used as a range in sourcing the blocks present inside a blockchain and surface the data back to the user. The exchange of filter attributes versus filtered data may be provided by Data API 140. For example, once the user specifies a date range; say "a to d <a, b, c, d>", Data API 140 may fetch the records from a to d from distributed ledger 140. When the data for a is available, Data API 140 streams that set of data to the user while collecting data for the remaining b, c and d of the date range. Asynchronous calls may be initiated by Data API 140 to perform this function successfully.

Distributed ledger 150 may be a permissioned distributed ledger. For example, Quorum, which is an Ethereum-based distributed ledger protocol that supports transaction and contract privacy may be used. Distributed ledger 150 may provide one or more of the following: (1) transaction and contract privacy; (2) multiple voting-based consensus mechanisms; (3) network/peer permissions management; (4) high performance.

Figure 2:
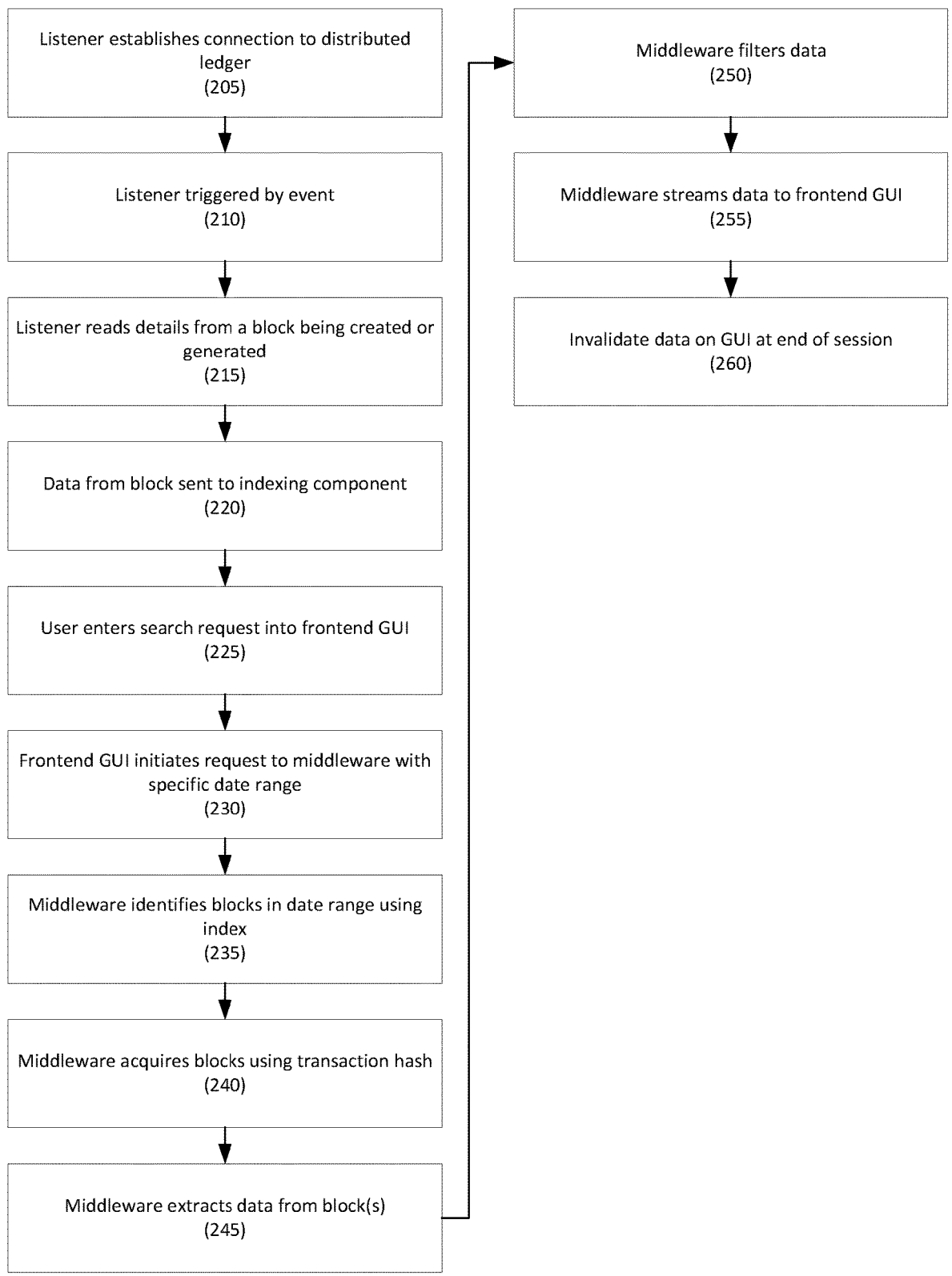
FIG. 2 depicts a method for using distributed ledger micro reporting tools according to one embodiment.

Referring to FIG. 2, a method for using a distributed ledger micro reporting tool is disclosed according to one embodiment.

In step 205, a listener may establish a connection with the underlying distributed ledger, such as a blockchain, so that the listener will be notified on the creation/generation of each new block. In one embodiment, the connection may be a persistent connection.

In step 210, the listener may be triggered by an event, such as the creation or generation of a block in the distributed ledger.

In step 215, the listener may read details from the block. In one embodiment, the details that are read may include the block id, the block timestamp, the hash of each transaction that is part of this block, etc.

In one embodiment, the transaction hash may be used to identify one transaction within the block.

In step 220, the transaction hash may be sent to an indexing component or middleware that may add a timestamp-based index. In one embodiment, the middleware may not extract data out from the block, or any transactions of it.

In one embodiment, the index may identify a transaction. For example, one block may include multiple transactions depending on the size of the block, the block time, etc. The index may store a hash index identifier (e.g., transaction hash) and date/time range of these transactions, which enables it to find all the transaction for a particular date range.

In one embodiment, the index may be stored in a file on the distributed ledger or at a node.

In step 225, a user may enter a search into a frontend GUI. For example, a user may enter a search based on a date range. In another embodiment, the user may request one or more blocks of data using a separate channel, such as via an API.

In one embodiment, the search may be received from another system (e.g., an automation module).

In one embodiment, current date related records may be available on the user interface without searching.

In step 230, the frontend GUI may initiate a request to the middleware to retrieve blocks with a specific date range. In one embodiment, the request may be an API request. In one embodiment, the middleware APIs may be secured and may only be accessed internally from the DApp only.

In one embodiment, the frontend GUI may support multiple data formats, including, for example, .csv, .xml, .json and .protobuf, as well as multiple data connections such as file uploads, API based access, data streams, direct database access, etc.

In step 235, the middleware may identify the block(s) to retrieve that are within the specified data range. For example, the middleware may use the index to retrieve block associated with the transaction hashes within the date range.

In step 240, the middleware may acquire or retrieve the blocks, and, in step 245, may extract the required data. Any secured or encrypted data may be extracted using, for example, node keys (private/public) using the interface (e.g., connectors provided via web3).

In one embodiment, only private transactions that involve the party (e.g., the node) may be decrypted. Public transactions may be available to all parties involved.

After the data is received, in step 250, the middleware may filter the data to remove any unwanted data or any transactions or blocks that are not accessible to requesting node. For example, transactions that do not involve the party using the DApp may be filtered.

After each block is processed, in step 255, the data may be streamed to the frontend GUI without waiting for all the blocks to be processed. Steps 230-250 may be repeated for each block in the date range.

In step 260, after the session is closed, the extracted data on the GUI may be invalidated so that the data is only available in its extracted form when the users is requesting the data. For example, because the data is not cached, it is erased from memory. If the data is requested again after the session is closed, the blocks may have to be retrieved, decrypted, filtered, and streamed again.

Although several embodiments have been disclosed, it should be recognized that these embodiments are not exclusive to each other, and features from one embodiment may be used with other embodiments as is necessary and/or desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The user interface may include features similar to the ones available within the various BI tools in the market like Share/Distribute report, high end visualizations and scheduling capability, etc.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using a distributed ledger micro reporting tool, comprising:
  in a distributed computer application executed by an information processing apparatus comprising at least one computer processor:
    an event listener establishing a connection to a distributed ledger;
    in response to the creation of each block of a plurality of blocks on the distributed ledger, the event listener reading block details from the block, wherein the block comprises a plurality of transactions, and the block details comprise a transaction hash for each of the plurality of transactions;
    indexing the transaction hash with a timestamp; and
    storing the index of the transaction hash with the timestamp.

2. The method of claim 1, wherein at least one of the plurality of transactions in the block is encrypted.

3. The method of claim 1, wherein at least one of the plurality of transactions is a private transaction.

4. The method of claim 1, wherein at least some of the transactions involve parties other than a party associated with the distributed computer application.

5. The method of claim 1, further comprising:
  receiving, from a user interface as part of a user session, a search request, wherein the search request identifies at least one transaction date;
  identifying, using the index, one of the plurality of blocks that comprises at least one transaction meeting the transaction date;
  retrieving in the identified block from the distributed ledger;
  extracting the transactions from the retrieved block; and
  invaliding the transactions on the user interface at an end of the user session.

6. The method of claim 5, wherein the user interface is a lightweight graphical user interface.

7. The method of claim 5, wherein the user interface is executed by an electronic device.

8. The method of claim 5, wherein the transactions in the block are encrypted, further comprising:
  decrypting the encrypted transactions.

9. The method of claim 5, further comprising:
  filtering unwanted transactions from the extracted transactions.

10. A system for using a distributed ledger micro reporting tool, comprising:
  a distributed ledger network comprising a plurality of nodes, each node comprising a copy of a distributed ledger; and
  a distributed application executed by each node comprising an event listener in communication with the copy of the distributed ledger;
  wherein:
  the event listener establishes a connection with the copy of the distributed ledger;
  in response to the creation of each block of a plurality of blocks on the distributed ledger, the event listener reads block details from the block, wherein the block comprises a plurality of transactions, and the block details comprise a transaction hash for each of the plurality of transactions
  the event listener indexes the transaction hash with a timestamp; and
  the event listener stores the index of the transaction hash with the timestamp in a hash index.

11. The system of claim 10, wherein at least one of the plurality of transactions in the block is encrypted.

12. The system of claim 10, wherein at least one of the plurality of transactions is a private transaction.

13. The system of claim 10, wherein at least some of the transactions involve parties other than a party associated with the distributed application.

14. The system of claim 10, further comprising a user device comprising at least one computer processor;
wherein:
    a user interface in the distributed computer application receives a search request from the user device, wherein the search request identifies at least one transaction date;
    the distributed computer application identifies, using the hash index, one of the plurality of blocks that comprises at least one transaction meeting the transaction date;
    the distributed computer application retrieves the identified block from the distributed ledger;
    the distributed computer application extracts the transactions from the retrieved block; and
    the distributed computer application invalidates the transactions on the user interface at an end of the user session.

15. The system of claim 14, wherein the user interface is a lightweight graphical user interface.

16. The system of claim 14, wherein the user interface is executed by an electronic device.

17. The system of claim 14, wherein the transactions in the block are encrypted, and the distributed computer application decrypts the encrypted transactions.

18. The system of claim 14, wherein the distributed computer application decrypts filters filtering unwanted from the transactions.

\* \* \* \* \*